United States Patent [19]

Best

[11] Patent Number: 5,013,803

[45] Date of Patent: May 7, 1991

[54] HOMOGENEOUS OR SUPPORT VANADIUM CATALYST OLEFIN POLYMERIZATION PROCESS

[75] Inventor: Steven A. Best, Houston, Tex.

[73] Assignee: Exxon Chemical Patents, Inc., Linden, N.J.

[21] Appl. No.: 498,302

[22] Filed: Mar. 23, 1990

Related U.S. Application Data

[62] Division of Ser. No. 276,978, Nov. 28, 1988, Pat. No. 4,954,471.

[51] Int. Cl.$^5$ .............................................. C08F 4/68
[52] U.S. Cl. ................................... 526/128; 502/125; 526/352
[58] Field of Search ................................ 526/128, 352

[56] References Cited

U.S. PATENT DOCUMENTS

| | | | |
|---|---|---|---|
| 2,943,063 | 6/1960 | Eby et al. | 526/352 X |
| 3,238,145 | 3/1966 | Loeb | 526/352 X |
| 3,281,375 | 10/1966 | Vandenberg | 526/352 X |
| 4,831,000 | 5/1989 | Miro | 526/116 X |

*Primary Examiner*—Patrick P. Garvin
*Attorney, Agent, or Firm*—T. Dean Simmons

[57] ABSTRACT

Disclosed is a homogeneous vanadium catalyst composition prepared by the reaction of an alkylaluminum dihalide with a solid reaction product produced by reacting (A) a silicon alkoxide, (B) a hydrocarbon soluble vanadium compound, and (C) a trialkylaluminum. The solid reaction product may be produced by complexing the (A) silicon alkoxide first with either the (B) vanadium compound or the (C) trialkylaluminum. The intermediate complex (I) of such reaction is then treated with the remaining reageant (either the vandium compound or the trialkylaluminum as the case may be) whereupon the solid reaction product (II) is formed. The solid reaction product (II) of the silicon alkoxide-vanadium compound/trialkylaluminum reaction is then reacted with (D) an alkylaluminum dihalide to produce a homogeneous hydrocarbon soluble product (III) which is highly active for catalyzing the polymerization of olefines to a polyolefin having a narrow molecular weight distribution. Further, the hydrocarbon soluble product (III) may be used to treat a catalyst support material (E) to produce a heterogeneous supported vanadium-containing catalyst composition (IV) which is highly active for catalyzing the production of polyolefins having a narrow molecular weight distribution.

15 Claims, No Drawings

HOMOGENEOUS OR SUPPORT VANADIUM CATALYST OLEFIN POLYMERIZATION PROCESS

This is a division of application Ser. No. 276,978, filed Nov. 28, 1988.

BACKGROUND OF THE INVENTION

1. Field Of Invention

The invention relates to a highly active vanadium catalyst, and to a method for its production, which may be used in either a homogeneous or supported form for the polymerization of olefins to polyolefin having a narrow molecular weight distribution (MWD).

2. Background Information

The use of vanadium-based catalysts for the polymerization of olefins is well known. Early forms of vanadium catalysts were generally produced in oily or gummy forms which, to prevent reactor fouling, were useful only in high temperature solvent polymerization procedures wherein the product polyolefin was soluble in the polymerization solvent. To produce such vanadium catalysts in a form suitable for use in a slurry or gas phase polymerization reaction, it was necessary to deposit the vanadium catalysts on a support material. Although in heterogeneous supported form the vanadium catalyst could be used for the slurry or gas phase production of polyolefin directly in particle form in the reaction, the use of vanadium catalyst in supported form carried with it the consequence that the polyolefin product polymer would have a very broad molecular weight distribution (MWD). For very high molecular weight polyolefins the broad MWD Characteristic is desirable, for certain applications, for instance when the polyolefin is intended for blow molding and extrusion applications. For other end use applications requiring a low to medium molecular weight polyolefin this broad MWD characteristic is undesirable because of the generation of an unacceptable amount of smoke during processing; for example, when a polyolefin of medium or low molecular weight is required for use in an application such as blow molding of household and industrial containers. As a consequence of its broad MWD, a medium or low molecular weight polymer contains a significant amount of low molecular weight ($C_{10-32}$) oligomers which vaporize in blow molding processes to cause smoke.

Consequently, efforts in the art have been directed to the production of a high activity vanadium catalyst composition in solid form without the requirement of a catalyst support or alternatively to the production of a supported vanadium catalyst which will nevertheless produce a polyolefin of narrow MWD. Hence, U.S. Pat. No. 4,514,514 and U.S. Pat. No. 4,507,449 describe the production of a vanadium catalyst composition in solid form. This catalyst comprises a solid produced by the reaction of a vanadium compound, an organophosphorus compound, and a metal halide which precipitates to a solid form when an organoaluminum halide, partiCularly ethyl aluminum dichloride (EADC), is added. It is clear from the examples given in both patents that only a portion of the vanadium component precipitates from the reaction solution as a solid product. Likewise, EPO No. 86,481A describes a solid form of Catalyst which may contain vanadium in addition to another transitional metal, principally titanium or zirconium, with a silicon compound which is then reacted with an organomagnesium compound to yield a solid product. Upon treating this solid product with EADC, a solid catalyst composition is formed.

In each of the above-described catalyst systems, to produce a solid reaction product it is necessary to employ either an organometallic compound, such as an organophosphorus or organomagnesium compound, to produce the final catalyst system or to use an organoaluminum halide, particularly EADC which either precipitates the catalyst in solid form from solution, or reduces a solid product to an active catalytic form.

It would be desirable to develop a vanadium-based Catalyst for the polymerization of olefins to polyolefins of a narrow MWD which is soluble in hydrocarbons, which may be used in homogeneous or heterogeneous form, and which is highly active.

SUMMARY OF THE INVENTION

This invention discloses a novel vanadium-based catalyst, and a process for producing this catalyst, which has high activity and is capable of producing polyolefins having a relatively narrow MWD.

The homogeneous vanadium catalyst of this invention results from the reaction of an alkylaluminum dihalide with a solid reaction product produced by reacting (A) a silicon alkoxide, (B) a hydrocarbon soluble vanadium compound, and (C) a trialkylaluminum. The solid reaction product may be produced by complexing the (A) silicon alkoxide first with either the (B) vanadium compound or the (C) trialkylaluminum. The intermediate complex (1) of such reaction is then treated with the remaining reagent (either the vanadium compound or the trialkylaluminum as the case may be) whereupon the solid reaction product (II) is formed. The solid reaction product (II) of the silicon alkoxide-vanadium compound/trialkylaluminum reaction is then reacted with (D) an alkylaluminum dihalide to produce a homogeneous hydrocarbon soluble product (III) which is highly active for catalyzing the polymerization of olefins to a polyolefin having a narrow molecular weight distribution. Further, the hydrocarbon soluble product (III) may be used to treat a catalyst support material (E) to produce a heterogeneous supported vanadium-containing catalyst composition (IV) which is highly active in slurry or has phase processes for catalyzing the production of polyolefins having a narrow molecular weight distribution.

DESCRIPTION OF THE PREFERRED EMBODIMENTS

The vanadium catalyst of this invention comprises a hydrocarbon soluble product resulting from the reaction of an alkylaluminum dihalide with a solid hydrocarbon insoluble reaction product produced from the reaction of (A) a silicon alkoxide with (B) a hydrocarbon soluble vanadium compound and (C) a trialkylaluminum. The order in which the (A) silicon alkoxide is reacted with the (B) vanadium compound and (C) the trialkylaluminum to produce the solid hydrocarbon insoluble reaction product (II) is not critical. An intermediate complex (I) may be formed by reacting (A) the silicon alkoxide with (B) the vanadium compound, which is then treated with (C) the trialkylaluminum to produce the solid reaction produce (II). Alternatively, an intermediate complex (I) may be formed by reacting (A) the silicon alkoxide with (C) the trialkylaluminum, which is then treated with the (B) vanadium compound to produce the solid reaction product (II). The solid reaction product (II) produced by either order of reaction is, upon reaction with (D) an alkylaluminum dihalide, converted to a homogeneous hydrocarbon soluble product (III) which is itself a highly active homogeneous vanadium-based polymerization catalyst or which may be utilized to treat (E) a catalyst support material to prepare a highly active heterogeneous supported catalyst composition (IV). Both forms of the vanadium catalyst of this invention, namely the homogeneous form and the supported heterogeneous form, are highly active for the production of narrow molecular weight distribution polyolefins.

The silicon alkoxide compounds used in preparing the intermediate reaction product (I) have the formula:

$$Si(OR^s)_{4-k}R_k^{s'}$$

wherein $R^s$, $R^{s'}$ are $C_{1-18}$ hydrocarbon radicals, preferably $C_{1-9}$ cyclic or acylic radicals, most preferably free of ethylenic unsaturation and "k" is a number greater than or equal to 0 and less than or equal to 3.

Exemplary silicon alkoxide compounds include tetraethoxysilane, tetrabutoxysilane, tetramethoxysilane, tetrapropoxysilane, tetraphenoxysilane, phenyltrimethoxysilane, phenyltriethoxysilane, phenethyltrimethoxysilane, benzyltriethoxysilane, diethyldiethoxysilane, ethyltriethoxysilane, methyltri-n-propoxysilane. octadecyltriethoxysilane, octyltriethoxysilane. Specific silicon alkoxide compounds preferred for use are tetraethoxysilane and tetrabutoxysilane.

Vanadium compounds which may be suitably employed in practicing this invention are hydrocarbon-soluble vanadium compounds in which the vanadium valence is 3 to 5. Vanadium compounds suitable for use in preparing a catalyst of the invention are known in the art and may be represented by the formulas:

$$\underset{\|}{\overset{O}{V}}X_m(OR^v)_{3-m} \quad (a)$$

$$VX_n(OR^v)_{4-n} \quad (b)$$

$$\underset{\|}{\overset{(O)_{3-p}}{V}}(R^{v'})_p \quad (c)$$

$$VX_{3}{\cdot}q\mathrm{L} \quad (d)$$

and $$\underset{\|}{\overset{O}{V}}(X)_x(R^{v'})_y \quad (e)$$

wherein:
m is 0–3;
n is 0, 3–4;
p is 2–3;
q is 0 or 2–3;
x and y are 1–2, $x \neq y$;
$R^v$ is a $C_{1-18}$ hydrocarbon radical, preferably a $C_{1-9}$ acyclic or cyclic hydrocarbon radical, most preferably free of ethylenic unsaturation;
$R^{v'}$ is acetylacetonate;
X is -Cl or -Br; and
L is a Lewis base capable of forming hydrocarbon-soluble complexes with $VX_3$. Exemplary of the vanadium compounds which may be used are vanadyl trichloride, vanadium tetrachloride, tetrabutoxyvanadium, vanadiumtrichloride, vanadyl acetylacetonate, vanadium acetylacetonate, vanadyl dichloroacetylacetonate, vanadyl chlorodiactylacetonate, vanadium trichloride complexed with tetrahydrofuran, vanadyl tribromide, vanadium tetrabromide, vanadyl dibutoxychloride and the like. Specific vanadium compound preferred for use in preparing catalysts of this invention are vanadyl trichloride.

The trialkylaluminum compounds used to form the intermediate reaction product (I) or to further treat the intermediate reaction product (I) are of the formula:

$$Al(R)_3$$

wherein R is a $C_{1-18}$ hydroCarbon radical, preferably a $C_{1-9}$ cyclic or acyclic radical, most preferably free of ethylenic unsaturation. Hence R may be an alkyl, cycloalkyl or aryl group.

Exemplary trialkyl-aluminum compounds include trimethylaluminum, triethylaluminum, tributylaluminum, tri-isobutylaluminum, tri-n-pentylaluminum, tri-n-octylaluminum, and the like. The molecular weight distribution of the final catalyst composition is affected by the trialkylaluminum of choice. For example, the trialkylaluminums comprising the more reactive alkyl groups, such as methyl compared to ethyl, when employed generally results in a broader molecular weight distribution resin as reflected in the melt index ratio (MIR) compared to resin produced from a catalyst made with a less reactive trialkylaluminum. Specific trialkylaluminum Compounds preferred for use are triethylaluminum (TEAL) or tributylaluminum.

The intermediate reaction product (I) is produced by reacting either the trialkylaluminum (TAA) or the vanadium compound with the silicon alkoxide (SA). This reaction is carried out in a hydrocarbon liquid in which SA compound and the vanadium compound or the TAA are soluble. The order of mixing is not critical. Thus the SA and the vanadium compound or the TAA may be added separately or simultaneously to the hydrocarbon liquid or may be separately prepared as hydrocarbon solutions and then added in solution to a reaction vessel in any order.

Hydrocarbon liquids suitable as solvents for the reaction include any saturated aliphatic or cyclic aliphalic hydrocarbon which is a liquid at reaction temperatures. Examples of suitable hydrocarbon solvents include well-known inert solvents such as hexane, heptane, benzene, toluene, and the like. The preferred hydrocarbon liquids are those which are also solvents for the vanadium, trialkylaluminum and alkylaluminum dihalide Compounds, which in subsequent steps will be added to the solution. Preferably, the hydrocarbon solvent should have a vapor pressure which renders it easily evaporated under mild conditions such as a nitrogen purge at room temperature.

As noted, SA and the vanadium compound or TAA are reacted in solution in the hydrocarbon solvent. The reaction may be readily accomplished by agitating the solution at moderate temperatures such as 20–50° C., preferably about 30° C., under a nitrogen atmosphere. The reaction is generally complete in about 30 minutes, although a longer time for reaction may be employed if desired.

After formation of the intermediate product (I) the remaining or third reagent—that is, either the vanadium compound or the trialkylaluminum, whichever was not utilized in the formation of the intermediate product (I)—is then added to the solution of the intermediate product (I). The third reagent may be added to the solution of intermediate product in neat form, although it is preferred to add the third reagent in the form of a hydrocarbon solution. The suitable hydrocarbons for dissolving the third reagent are the same as discussed before.

The solution of third reagent is added to the solution of intermediate product with stirring, and the temperature of the resulting solution is then raised to from about 40° C. to about 80° C., preferably about 75° C., and maintained at this temperature. Generally the reaction will reach completion in about one hour, but a longer period of reaction may be allowed if desired. The third reagent undergoes reaction with the intermediate product to form a dark precipitate (II). As the reaction proceeds to completion, the precipitate may change color and will become increasingly dense. When there is no further change in color or density of the precipitate, the reaction has reached Completion. The precipitate is the solid hydrocarbon insoluble reaction product (II) which will then be reacted with (D) an alkylaluminum dihalide.

Upon completion of the reaction with the third reagent, an alkylaluminum dihalide (AAD) is added to the solution. Although the AAD may be added neat, it is preferred to add the AAD as a hydrocarbon solution. AAD's suitable for use are those having the formula:

$$Al(R^a)Y_2$$

wherein $R^a$ is a $C_{1-18}$ hydrocarbon radical, preferably a $C_{1-9}$ acrylic or cyclic radical, most preferably free of ethylenic unsaturation and Y is a halogen atom.

Exemplary of the AAD's which may be used are methylaluminum dichloride, ethylaluminum dichloride, butylaluminum dichloride, isobutylaluminum dichloride, ethylaluminum dibromide, ethylaluminum diiodide, butylaluminum dibromide, and butylaluminum diiodide and the like. The specific AAD preferred for use is ethylaluminum dichloride (EADC) or isobutylaluminum-dichloride.

The AAD solution is added with stirring to the solution containing the precipitate product (II). The AAD reacts with the precipitate to yield a composition which is soluble in the hydrocarbon solvent (III). Completion of the reaction is observed when all the precipitate has been dissolved or when further amounts of precipitate do not dissolve over time and the color of the hydrocarbon solution undergoes no further change in intensity.

The hydrocarbon soluble composition (III) constitutes a vanadium composition which is catalytically active for the polymerization of olefins to polyolefins. The vanadium composition may be used in the solution form as produced (assuming the hydrocarbon solvents are also suitable polymerization solvents) for solution polymerization of olefins without further purification or recovery. Or, if desired, a portion or all of the hydrocarbon solvent may be evaporated and a liquid vanadium composition may be recovered in more concentrated liquid form for use as a catalyst.

Alternatively, the vanadium composition solution (III) may be employed to produce a heterogeneous or supported form of vanadium catalyst. In this embodiment, the vanadium composition solution would preferably be allowed to cool to ambient temperature. Thereafter a (E) catalyst support material would be added to the vanadium composition solution (III) with stirring to form a slurry. The slurried solution would be continuously stirred for an appropriate length of time, on the order of about 30 minutes is sufficient, although longer stirring times may be employed. Thereafter stirring would be discontinued, the solids allowed to settle, clear solvent decanted, and the solids (IV) recovered and dried under a flow of nitrogen.

Catalyst support materials useful for preparing a supported vanadium catalyst in accordance with this invention include any of the solid particulate porous supports such as talc, silica, zircona, thoria, magnesia, and titania. Preferably the support material is a Group IIa, IIIa, IVa or IVb metal oxide in finely divided form. Suitable inorganic oxide materials, which are desirably employed in accordance with this invention include silica, alumina, and silica-alumina and mixtures thereof. Other inorganic oxides that may be employed either alone or in combination with silica, alumina or silica-alumina are magnesia, titania, zirconia, and the like. Other suitable support materials, however, can be employed, for example, finely divided polyolefins such as finely divided polyethylene.

The metal oxides generally contain acidic surface hydroxyl groups which will react with the organometallic composition or transition metal compound which are added to the reaction solvent. Prior to use, the inorganic oxide support is dehydrated, i.e., subjected to a thermal treatment in order to remove water and reduce the concentration of the surface hydroxyl groups. This treatment is carried out in vacuum or while purging with a dry inert gas such as nitrogen at a temperature of about 100 to about 1000° C. and preferably from about 300° C. to about 800° C. Pressure Considerations are not critical and the duration of the thermal treatment Can be from about 1 to about 24 hours. However, longer or shorter times can be employed provided equilibrium is established with the surface hydroxyl groups.

Chemical dehydration as an alternative method of dehydration of the metal oxide support material can advantageously be employed. Chemical dehydration converts all water and hydroxyl groups on the oxide surface to inert species. Useful chemical agents are, for example, silicon tetrachloride, chlorosilanes, silylamines and the like. Chemical dehydration is accomplished by slurrying the inorganic particulate material, such as, for example, silica in an inert hydrocarbon solvent, such as, for example, heptane. During the dehydration reaction, the silica should be maintained in a moisture and oxygen free atmosphere. To the silica slurry is then added a low boiling inert hydrocarbon solution of the chemical dehydrating agent, such as, for example, dichlorodimethyl silane. The solution is added slowly to the slurry. The temperature range during the chemical dehydration reaction can be from about 25° C. to about 120° C., however, higher and lower temperatures can be employed. Preferably the temperature will be from about 50° C. to about 70° C. The chemical dehydration procedure should be allowed to proceed until all the moisture is removed from the particulate support material as indicated by cessation of gas evolution. Normally the dehydration reaction will be allowed to proceed from about 30 minutes to about 16 hours, preferably 1 to 5 hours. Upon completion of the dehydration reaction, the solid particulate material is filtered under a nitrogen atmosphere and washed one or more limes with a dry, oxygen-free inert hydrocarbon solvent.

The general procedure for preparing catalysts of the invention has been described. The specific properties of a particular catalyst composition are determined by the amounts of each reagent utilized.

In preparing the solid reaction product (II), a mole ratio of trialkyl aluminum to silicon alkoxide of from about 0.5 to about 2.0, preferably from about 1.0 to about 1.5, should be observed. The quantity of vanadium compound utilized to prepare the solid reaction product (II) should be selected to provide a vanadium precipitate composition product (II) containing vanadium metal from about 0.3 to about 10 weight % V, more preferably from about 0.7 to about 3 weight % V. The total quantity of TAA employed in Comparison to the quantity of vanadium compound, should be such as to provide a mole ratio of aluminum to vanadium of from about 3 to about 2.0, preferably from about 5 to about 15. The quality of AAD compound added to the solid reaction produCt (II) should be selected to provide a mole ratio of aluminum to vanadium of from about 7 to 30, preferably from about 10 to about 20. When utilizing the hydrocarbon soluble vanadium composition (III) to form a supported catalyst, an amount of catalyst support material should be used to provide a vanadium metal loading based upon the total weight of the supported catalyst of from about 0.2 to about 10 weight % V, preferably from about 0.5 to about 5 weight % V.

Catalysts of the invention are particularly suited for homo or copolymerizing olefins to homo or copolyolefins. Examples of typical olefin monomers which undergo polymerization in the presence of the catalyst of this invention include ethylene, other alpha-olefins having from 3 to 20 carbon atoms, such as for example, propylene, butene, pentene, hexene, 4-methylpentene-1, and the like and ethylene copolymers with other alpha-olefins or di-olefins such as 1,4-pentadiene, 1,5-hexadiene, butadiene, 2-methyl-1,3-butadiene and the like. The monomer of preference is ethylene.

The conditions under which polymerization may be conducted with catalysts of this invention include solvent polymerization in a liquid diluent such as alkanes or cycloalkanes, gas phase polymerization, or single phase (high pressure) polymerization, any of which techniques may be carried out by a catch or continuous polymerization technique.

The catalyst composition of the invention may be used as such, or preferably in conjunction with a cocatalyst comprising an organometallic reducing agent. Typical examples of cocatalyst reducing agents are Group Ia, IIa, and IIIa metals such as aluminum alkyls, aluminum alkylhydrides, lithium aluminum alkyls, zinc alkyls, magnesium alkyls and the like. The cocatalysts preferably used are the organoaluminum compounds represented by the formula:

$R_m°MX_{3-p}$ wherein R° is a $C_{1-18}$ hydrocarbon radical, preferably a $C_{1-9}$ acrylic or cyclic radical, free of ethylenic unsaturation, X is a halogen atom, $1 \leq m$, $p \leq 3$.

Exemplary of these cocatalysts are ethylaluminum dichloride, ethylaluminum sesquichloride, diethylaluminum chloride, triethylaluminum, tributylaluminum, diisobutylaluminum hydride, diethylaluminum ethoxide and the like. The specific cocatalysts most preferred for use with the vanadium catalyst of this invention are triethylaluminum and triisobutylaluminum.

The vanadium catalyst composition of the invention, especially when used with a cocatalyst as described, has a sufficiently high level of sustainably catalytic activity that the use of a halocarbon activator is not required. However, the addition of a halocarbon activator to catalysts of the invention will further enhance its activity. Halogen substituted alkanes having 1 through 10 carbons, more preferably 1 to 5 carbon atoms, are suitable activators. Exemplary of the preferred activators are the chlorocarbons such as trichloromethane, trichlorofluoromethane, dichloromethane, ethyltrichloroacetate, methyltrichloroacetate, hexaohloropropylene, butylperchlorocrotonate, 1,3-dichloropropane, 1,2,3-trichloropropane, and 1,1,2-trichlorotrifluoroethane, etc. The activators may be gases or liquids at the conditions of polymerization.

When an aluminum containing cocatalyst or an activator are used in conJunction with the vanadium catalyst composition of the invention, an amount of cocatalyst is used such that the sum of the aluminum in the cocatalyst and the vanadium catalyst composition is in mole ratio to the vanadium content of the catalyst in the ratio from about 5 to about 500, preferably from about 10 to about 100. When an activator is used, it is employed in from 10 to 1000 moles activator to moles vanadium, preferably a 50 to 300 molar ratio.

The polymers produced by the catalyst of this invention are characterized as having a "narrow" MWD. While it is possible to measure MWD directly, a less expensive indirect method, using melt indices which measure the rate of shear of the polymer, has been successfully employed to characterize polymer MWD. The melt index ratio (MIR) is the ratio of two measured indices, namely the high load melt index (HLMI) divided by the melt index (MI). The MI of a polymer, which is also a measure of its molecular weight, is measured as described in ASTM D 1238 Condition E. Briefly, the method measures the rate of extrusion of a resin through an orifice of specified diameter and length at 190° C. and under a load of 2,160 grams (about 43.25 psi). The MI is inversely related to the polymer molecular weight because a higher molecular weight polymer will require greater shear forces to induce it to flow, i.e. it will flow less readily than a lower molecular weight polymer. Thus a higher molecular weight polymer will have a lower MI. The method of measuring the HLMI is the same as that for the MI except that ASTM D 1238 specifies Condition E which requires a pressure 10 times greater than that for the MI measurement. The MIR (HLMI/MI) is a measure of the polymer's shear response and larger MIR values indicate broader MWD's.

Catalysts of the invention are highly active, whether in homogeneous or heterogeneous form in comparison to similar vanadium catalyst compositions produced by conventional procedures.

Further, in comparison to supported vanadium catalyst compositions produced by conventional techniques, supported vanadium compositions produced in accordance with the invention produce a polyolefin of much narrower MWD.

EXAMPLE 1

Preparation Sequence of
TEAL/Si(OEt)$_4$/VOCl$_3$/EADC+silica

Dried and degassed heptane (20 ml) was charged into a 125 cc vial containing a stir bar. To the vial was then added 15.8 mmoles of triethyaluminum (TEAL) followed by 18 mmoles of tetraethylorthosilicate (Si(OEt)$_4$). The product was stirred for 1 hour at 30° C.

Vanadium oxytrichloride (VOCl$_3$) (1.8 mmoles) was then added to the above product and the temperature increased to 60° C. After achieving the 60° C. temperature, stirring was continued for 1 hour. During this step the initial purple solid formed upon addition of the VOCl$_3$ changes color to a dark green. After cooling the product to 40° C., 15.9 mmoles of ethylaluminum dichloride (EADC) was added with continued stirring. The green precipitate dissolves to yield a light green solution. A portion of this solution containing 1 mmole of vanadium was added to silica gel previously dehydrated at 500° C. or 800° C. The resultant slurry was stirred at room temperature for 30 minutes followed by evaporation of the solvent under a flowing nitrogen stream. The resultant free flowing powder was a light green color.

Polymerization

A 2.1 liter autoclave was charged with 800 ml of purified dried hexane. The hexane was heated to 50° C. To this was added a triisobutylaluminum (TIBAL) cocatalyst to produce a Al/V ratio of 50:1. A white oil slurry containing 0.25 grams of supported solid or a solution of the catalyst containing 0.06 mmole V/ml. In addition, CFCl$_3$ was added to produce a CFCl$_3$/V molar ratio of 200:1. The reactor was heated to 85° C. and hydrogen and ethylene were introduced to provide a H$_2$/C$_2$ gas phase ratio of 0.025. The ethylene concentration in the slurry was adjusted to 0.599 moles/liter at 150 psig total pressure. The reaction was maintained at this temperature and pressure for 40 minutes at which time the reactor was cooled to room temperature and vented to atmospheric pressure. The polymer was recovered and the solvent evaporated to dryness.

TABLE 1

| | Vanadium Based Catalyst Performance | | |
|---|---|---|---|
| Formulation | Specific Activity (KgPE/gV-hr-mole/L C2) | MI g/10 min | MIR (HLMI/MI) |
| Solution + 800° C. silica | 279.7 | 1.13 | 37.1 |
| Solution + 800° C. silica (no CFCL$_3$ added to reactor) | 85.2 | 4.00 | 28.6 |
| Solution + 500° C. silica | 300.0 | 0.90 | 40.0 |
| Solution only | 468 | 5.5 | 13.2 |

EXAMPLE 2

Sequence of VOCl$_3$/Si(OEt)$_4$/TEAL/EADC+silica

Dried and degassed heptane (20 ml) was charged into a 125 cc vial containing a stir bar. To the vial was then added 18 mmoles of tetraethylorthosilicate (Si(OEt)$_4$) followed by 1.8 mmoles of vanadium oxytrichloride (VOCl$_3$). The product was stirred for 30 minutes at 30° C. Triethylaluminum (TEAL) (15.8 mmoles) was then added to the above product and the temperature increased to 60° C. The vial was placed in an oil bath preheated to 60° C. and the contents stirred for 60 minutes. During this step the initial purple solid formed upon addition of the TEAL changes color to a dark green. After cooling the product to 40° C., 15.9 mmoles of ethylaluminum dichloride (EADC) was added with continued stirring. The green precipitate dissolved to yield a light green solution. A portion of this solution containing 1 mmole of vanadium was added to silica gel previously dehydrated at 500° C. The resultant slurry was stirred at room temperature for 30 minutes followed by evaporation of the solvent under a flowing nitrogen stream. The resultant free flowing powder was a light green color.

Polymerization

Procedure as in Example 1.

TABLE 2

| | Vanadium Based Catalyst Performance | | |
|---|---|---|---|
| Formulation | Specific Activity (KgPE/gV-hr-mole/L C2) | MI g/10 min | MIR (HLMI/MI) |
| Solution + 500° C. silica | 310.0 | 0.91 | 42.0 |

EXAMPLE 3

Alternate Vanadium Compounds: VCl$_3$.nTHF

Dried and degassed heptane (20 ml) was charged into a 125 cc vial containing a stir bar. To the vial was then added 18 mmoles of tetraethylorthosilicate (Si(OEt)$_4$) followed by 1.8 mmoles of VCL$_3$.nTHF. The product was stirred for 30 minutes at 30° C. Triethylaluminum (TEAL) (15.8 mmoles) was then added to the above product. The vial was placed in an oil bath preheated to 60° C. and the contents stirred for 60 minutes. During this step the initial purple solid formed upon addition of the TEAL changes color to a dark green. After cooling the product to 40° C., 15.9 mmoles of ethylaluminum dichloride (EADC) was added with continued stirring. The green precipitate dissolves to yield a light green solution. A portion of this solution containing 1 mmole of vanadium was added to silica gel previously dehydrated at 500° C. The resultant slurry was stirred at room temperature for 30 minutes followed by evaporation of the solvent under a flowing nitrogen stream. The resultant free flowing powder was a light green color.

EXAMPLE 4

Alternate Vanadium Compounds: VO(OC$_3$H$_7$)$_3$

Dried and degassed heptane (20 ml) was charged into a 125 cc vial containing a stir bar. To the vial was then added 18 mmoles of tetraethylorthosilicate (Si(OEt)$_4$) followed by 1.8 mmoles of tri-n-propylvanadate (VO(OC$_3$H$_7$)$_3$). The product was stirred for 30 minutes at 30° C. Triethylaluminum (TEAL) (15.8 mmoles) was then added to the above product. The vial was placed in an oil bath preheated 60° C. and the contents stirred for 60 minutes. During this step the initial purple solid formed upon addition of the TEAL changed color to a dark green. After cooling the product to 40° C., 15.9 mmoles of ethylaluminum dichloride (EADC) was added with continued stirring. The green precipitate dissolved to yield a light green solution. A portion of this solution containing 1 mmole of vanadium was added to silica gel previously dehydrated to 500° C. The resultant slurry was stirred at room temperature for 30 minutes followed by evaporation of the solvent under a flowing nitrogen stream. The resultant free flowing powder was a light green color.

Polymerization

Procedure as in Example 1.

TABLE 3

| Alternate Vanadium Compound Catalyst Performance | | | |
|---|---|---|---|
| Formulation | Specific Activity (KgPE/gV-hr-mole/L C2) | MI g/10 min | MIR (HLMI/MI) |
| VCl$_3$nTHF (Exp. 3) | 186.1 | 0.72 | 40.7 |
| VO(OC$_3$H$_7$) (Exp. 4) | 27.1 | 0.66 | 47.8 |

The invention has been described with reference to its preferred embodiments. Those of ordinary skill in the art may appreciate changes and modifications which do not depart from the scope and spirit of the invention as described above or claimed hereafter.

What is claimed is:

1. A process for the polymerization of ethylene and α-olefins having from 1 to 20 carbon atoms or mixtures of ethylene, α-olefins and diolefins which process comprises polymerizing one or more olefins in the presence of a catalyst system comprising a vanadium catalyst component produced by the process comprising the steps of:
   (i) forming a hydrocarbon insoluble reaction product from a silicon alkoxide, a hydrocarbon soluble vanadium compound and a trialkylaluminum; and
   (ii) reacting said hydrocarbon insoluble reaction product with an alkylaluminum dihalide to form a hydrocarbon soluble vanadium containing composition which is active for the polymerization of olefins to polyolefins.

2. The process for the polymerization of ethylene and α-olefins of claim 1, wherein said silicon alkoxide is of the general formula Si(OR$^s$)$_{4-k}$R$^{s'}_k$ wherein R$^s$, R$^{s'}$ are C$_{1-18}$ hydrocarbon radicals and $0 \leq k \leq 3$; said hydrocarbon soluble vanadium compound is selected from the group consisting of the general formulas:

$$\underset{\text{VX}_m(\text{OR}^v)_{3-m}}{\overset{\text{O}}{\|}} \quad (a)$$

$$\text{VX}_n(\text{OR}^v)_{4-n} \quad (b)$$

$$\underset{\text{V}(\text{R}^{v'})_p}{\overset{(\text{O})_{3-p}}{\|}} \quad (c)$$

$$\text{VX}_3 \cdot q\text{L} \quad (d)$$

and $$\underset{\text{V}(\text{X})_x(\text{R}^{v'})_y}{\overset{\text{O}}{\|}} \quad (e)$$

wherein:
m is 0–3;
n is 0,3–4;
p is 2–3;
q is 0 or 2–3;
x and y are 1–2, x≠y;
R$^v$ is a C$_{1-18}$ hydrocarbon radical;
R$^{v'}$ is acetylacetonate;
X is -Cl or -Br; and
L is a Lewis base capable of forming hydrocarbon-soluble complexes with VX$_3$.

3. The process of claim 2 wherein said trialkylaluminum is of the general formula Al(R)$_3$ wherein R is a C$_{1-18}$ hydrocarbon radical.

4. The process of claim 3 wherein said alkylaluminum dihalide is of the formula:

$$\text{Al}(\text{R}^d)\text{Y}_2$$

wherein said R$^a$ is a C$_{1-18}$ hydrocarbon radical and Y is a halogen atom.

5. The process of claim 4 wherein said hydrocarbon insoluble reaction product is formed by first reacting said silicon alkoxide with said vanadium compound to form an intermediate product and thereafter reacting said intermediate product with said trialkylaluminum.

6. The process of claim 4 wherein said hydrocarbon insoluble reaction product is formed by first reacting said silicon alkoxide with said trialkylaluminum to form an intermediate product and thereafter reacting said intermediate product with said vanadium compound.

7. The process of claim 5 wherein said alkylaluminum dihalide is ethylaluminum dichloride.

8. The process of claim 7 wherein said silicon alkoxide is silicon tetra-alkoxide.

9. A process for the polymerization of ethylene and alpha-olefins having from 1 to 20 carbon atoms or mixtures of ethylene, alpha-olefins, and diolefins which process comprises polymerizing 1 or more olefins in the presence of a catalyst system comprising a vanadium catalyst component produced by the process comprising the steps of
   (i) contacting a silicon alkoxide of the formula Si(OR$^s$)$_{4-k}$R$^{s'}_k$ wherein R$^s$ are C$_{1-18}$ hydrocarbon radicals, and $0 \leq k \leq 3$ with a vanadium compound selected from the group consisting of the general formulas:

$$\underset{\text{VX}_m(\text{OR}^v)_{3-m}}{\overset{\text{O}}{\|}} \quad (a)$$

$$\text{VX}_n(\text{OR}^v)_{4-n} \quad (b)$$

$$\underset{\text{V}(\text{R}^{v'})_p}{\overset{(\text{O})_{3-p}}{\|}} \quad (c)$$

$$\text{VX}_3 \cdot q\text{L} \quad (d)$$

and $$\underset{\text{V}(\text{X})_x(\text{R}^{v'})_y}{\overset{\text{O}}{\|}} \quad (e)$$

wherein:
m is 0–3;
n is 0, 3–4;
p is 2–3;
q is 0 or 2–3;
x and y are 1–2, x=y;
R$^v$ is a C$_{1-18}$ hydrocarbon radical;
R$^{v'}$ is acetylacetonate;
X is -Cl or -Br; and
L is a Lewis a base capable of forming hydrocarbon-soluble complexes with VX$_3$ to form an intermediate reaction product (I);
   (ii) reacting said intermediate reaction product (I) with a trialkyl aluminum of the general formula Al(R)$_3$ wherein R is a C$_{1-18}$ hydrocarbon radical L is a Lewis a base capable of form a solid reaction product (II);
   (iii) adding to said solid reaction product (II) an alkylaluminum dihalide of the formula:

$$\text{Al}(\text{R}^d)\text{Y}_2$$

wherein $R^a$ is a $C_{1-18}$ hydrocarbon radical and Y is a halogen atom, to produce a homogeneous catalyst solution (III).

10. The process of claim 9 wherein said trialkylaluminum is triethylaluminum.

11. The process of claim 9 wherein said silicon alkoxide is silicon tetra-alkoxide.

12. The process of claim 9 wherein said alkylaluminum dihalide is ethylaluminum dichloride.

13. The process of claim 9 wherein the vanadium-based catalyst is prepared in heterogeneous supported form, further including the steps of:
   (iv) adding to said homogeneous catalyst solution (III) a dry support material to produce a slurry;
   (v) stirring said slurry for about 30 minutes; and
   (vi) separating a supported catalyst product from said slurry.

14. A process for the polymerization of ethylene and alpha-olefins having from 1 to 20 carbon atoms or mixtures of ethylene, alpha-olefins, and diolefins which process comprises polymerizing 1 or more component produced by the process comprising the steps of:
   (i) contacting a trialkyl aluminum of the general formula $Al(R)_3$, wherein R is a $C_{1-18}$ hydrocarbon radical, with a silicon alkoxide of the formula $Si(OR^s)_{4-k}R_k^{s'}$ where $R^s$, $R^{s'}$ are $C_{1-18}$ hydrocarbon radicals, and $0 \leq k \leq 3$, to form an intermediate reaction product (I);
   (ii) reacting said intermediate reaction product (I) with a vanadium compound selected from the group consisting of the general formulas:

$$\overset{O}{\underset{\|}{V}}X_m(OR^r)_{3-m} \quad (a)$$

$$VX_n(OR^r)_{4-n} \quad (b)$$

(c)

$$VX_3 \cdot qL \quad (d)$$

and

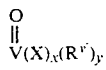
(e)

wherein:
m is 0–3;
n is 0, 3–4;
p is 2–3;
q is 0 or 2–3;
x and y are 1–2, x=y;
$R^v$ is a $C_{1-18}$ hydrocarbon radical;
$R^{v'}$ is acetylacetonate;
X is -Cl or -Br; and
L is a Lewis a base capable of forming hydrocarbon-soluble complexes with $VX_3$ to form an intermediate reaction product (I);

(iii) adding to said solid reaction product (II) an alkylaluminum dihalide of the formula:

$$Al(R^a)Y_2$$

wherein $R^a$ is a $C_{1-18}$ hydrocarbon radical and Y is a halogen atom, to produce a homogeneous catalyst solution (III).

15. The process of claim 11 wherein the vanadium-based catalyst is prepared in heterogeneous supported form, further including the steps of:
   (iv) adding to said homogeneous catalyst solution (III) a dry support material to produce a slurry;
   (v) stirring said slurring for about 30 minutes; and
   (vi) separating a supported catalyst product from said slurry.

* * * * *